United States Patent
Milligan et al.

(10) Patent No.: US 7,596,700 B2
(45) Date of Patent: Sep. 29, 2009

(54) METHOD AND SYSTEM FOR ESTABLISHING TRUSTING ENVIRONMENT FOR SHARING DATA BETWEEN MUTUALLY MISTRUSTING ENTITIES

(75) Inventors: Charles Milligan, Golden, CO (US); Kuntal G. Rawal, Lafayette, CO (US); Corey Klaasmeyer, Denver, CO (US); William Lynch, Boulder, CO (US); Diana Lubow, Fort Collins, CO (US)

(73) Assignee: Storage Technology Corporation, Louisville, CO (US)

( * ) Notice: Subject to any disclaimer, the term of this patent is extended or adjusted under 35 U.S.C. 154(b) by 915 days.

(21) Appl. No.: 11/022,710

(22) Filed: Dec. 22, 2004

(65) Prior Publication Data

US 2006/0136730 A1    Jun. 22, 2006

(51) Int. Cl.
| | |
|---|---|
| H04L 9/00 | (2006.01) |
| H04L 9/32 | (2006.01) |
| H04K 1/00 | (2006.01) |
| G06F 11/00 | (2006.01) |
| G06F 17/30 | (2006.01) |
| G06K 9/00 | (2006.01) |
| H03M 1/68 | (2006.01) |
| H04N 7/16 | (2006.01) |

(52) U.S. Cl. .................. 713/176; 713/179; 713/180; 713/185; 713/168; 713/169; 713/170; 726/27; 726/30

(58) Field of Classification Search .............. 713/176, 713/179, 185, 168–170; 726/27, 30
See application file for complete search history.

(56) References Cited

U.S. PATENT DOCUMENTS

| 5,146,572 A | 9/1992 | Bailey et al. |
| 5,249,284 A | 9/1993 | Kass et al. |
| 5,379,292 A | 1/1995 | Kurata et al. |
| 5,732,403 A | 3/1998 | Nakamura |
| 5,974,458 A | 10/1999 | Abe et al. |
| 6,272,535 B1 | 8/2001 | Iwamura |
| 6,542,993 B1 | 4/2003 | Erfani |

(Continued)

FOREIGN PATENT DOCUMENTS

EP    1 052 582 A2    11/2000

OTHER PUBLICATIONS

Gang Liang et al: "Privacy-preserving inter-database operations"; Intelligence and Security Informatics Second Symposium on Intelligence and Security Informatics, ISI Jun. 10-12, 2004, Tucson, Arizona, Proceedings (Lecture Notes in Comput. Sci. vol. 3073), Springer-Verlag Berlin, Germany, Jun. 2004, pp. 66-82.

(Continued)

*Primary Examiner*—Ayaz R Sheikh
*Assistant Examiner*—Shin-Hon Chen
(74) *Attorney, Agent, or Firm*—Brooks Kushman P.C.

(57) ABSTRACT

A method and system for sharing data and interrogating data include establishing a level of trust between mutually mistrusting entities so that data may be shared therebetween based on the level of trust. The method and system include interrogating data provided from one of the entities to the other entity without the receiving entity having complete access to the data associated therewith.

14 Claims, 1 Drawing Sheet

U.S. PATENT DOCUMENTS

| | | | |
|---|---|---|---|
| 6,567,953 B1 | 5/2003 | Pomerantz | |
| 6,654,853 B1 | 11/2003 | Gates et al. | |
| 7,272,719 B2 * | 9/2007 | Bleckmann et al. | 713/176 |
| 2002/0129087 A1 | 9/2002 | Cachin et al. | |
| 2002/0138621 A1 | 9/2002 | Rutherford et al. | |
| 2002/0194108 A1 | 12/2002 | Kitze | |
| 2003/0009513 A1 | 1/2003 | Ludwig et al. | |
| 2003/0110344 A1 | 6/2003 | Szczepancek et al. | |
| 2003/0154416 A1 | 8/2003 | LaBerge | |
| 2003/0172066 A1 | 9/2003 | Cooper et al. | |
| 2004/0039917 A1 * | 2/2004 | Ross | 713/179 |
| 2004/0093371 A1 | 5/2004 | Burrows et al. | |
| 2004/0111617 A1 * | 6/2004 | Patrick | 713/176 |
| 2004/0250100 A1 | 12/2004 | Agrawal et al. | |
| 2005/0132197 A1 * | 6/2005 | Medlar | 713/176 |
| 2006/0007936 A1 * | 1/2006 | Shrum et al. | 370/395.21 |

OTHER PUBLICATIONS

Teepe W: "New Protocols for Proving Knowledge of Arbitrary Secrets While not Giving Them Away", Knowledge and Games 2004, Jul. 10-11, 2004, Liverpool, UK, Proceedings of the First Knowledge and Games Workshop, [Online] Jul. 2004.

\* cited by examiner

METHOD AND SYSTEM FOR ESTABLISHING TRUSTING ENVIRONMENT FOR SHARING DATA BETWEEN MUTUALLY MISTRUSTING ENTITIES

BACKGROUND OF THE INVENTION

1. Field of the Invention

The present invention relates to establishing a trusting environment for sharing data between mutually mistrusting entities.

2. Background Art

In a collaborative grid computing environment, entities desire to electronically share data with each other. One example of such an environment is a research environment where at least two entities desire to share electronic data collected on a research matter. Preferably, this is done so that each entity can leverage off of the research of the other entity without having to perform the research themselves.

In the past, the data of each research entity was made known to the other entity so that a data comparison may be made and data shared. The problem with this approach is that the other entity may not be trustworthy in the sense that it may seek only to determine the data of the other entity without divulging its own data.

Accordingly, a need exists to establish a trusting environment for the entities to share their data.

SUMMARY OF THE INVENTION

One aspect of the present invention relates to providing a trusting environment for entities to share data.

One aspect of the present invention relates to a method for establishing trust between mutually mistrusting first and second entities, wherein each entity includes an electronic data collection of data and each desires to build trust with the other so that information stored on their respective data collections may be shared in a trusting environment. The method preferably includes determining a first signature for a first data array selected from a portion of a first data element stored on the data collection of the first entity, determining a second signature for a second data array selected from a portion of a second data element stored on the data collection of the second entity, generating a signature correlation value for the first and second signatures, and establishing a level of trust based on the signature correlation value.

The above method preferably further includes generating a number of signature correlation values for a number of data arrays selected from a number of data elements such that the level of trust may be based on the number of signature correlation values. In particular, a high level of trust may be determined if a predefined number of signature correlations have correlations values within a predefined correlation range which defines acceptable limits on matching the signatures such that the high level of trust represents that a number of data arrays of the first and second entities have closely matching signatures. As such, it is likely that additional data of the first and second data collections having non-matching signatures is likely to be of value to the other entity. Therefrom, the method may further including sharing at least a portion of the non-matching signature data between the entities if the high level of trust is determined.

One aspect of the present invention preferably relates to a method for a first entity to interrogate data of a second entity without the second entity providing complete access to the data. The method may include selecting a portion of the interrogated data and applying a signature algorithm thereto to produce a data signature and determining whether the data signature matches with one or more data signatures taken from data of the first entity such that the first entity includes data matching the interrogated data if the first entity includes a matching signature. In this manner, the first entity is able to interrogate data from the second entity without being provided with complete access to the data in so far as the first entity is able to determine from the data signature whether it includes matching data.

DETAILED DESCRIPTION OF THE PREFERRED EMBODIMENT(S)

Figure 1:
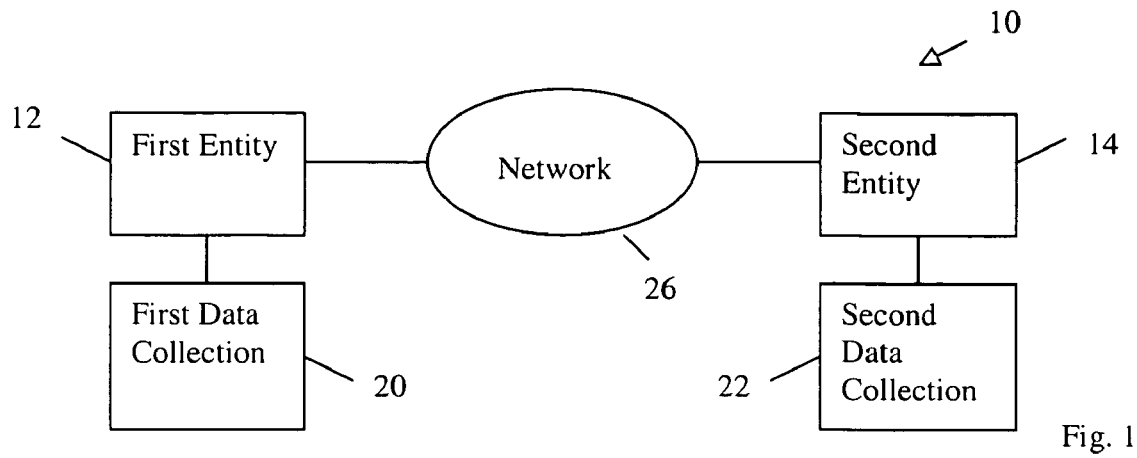
FIG. 1 illustrates a system for electronically sharing data between a first entity and second entity in accordance with one aspect of the present invention.

FIG. 1 illustrates a system 10 for electronically sharing data between a first entity 12 and second entity 14. For example, the entities 12,14 may be associated with research entities having research data stored on data collections 20, 22, such as electronic data associated with articles, papers, calculations, and other forms of data.

The first and second entities 12, 14 may be computers, servers, or other electronic data processing devices having capabilities for communication with each other over a network 26. The network 26 may correspond with any network, including the Internet, a wide area network (WAN), a local area network (LAN), and the like. The infrastructure of the network 26 may include any infrastructure, including public telephone switching, cable, satellite, wireless, and the like.

The present invention is not limited to the aforementioned research example. Rather, the present invention contemplates any environment, with any number of entities, where it is desirable to electronically share data, such as in peer-to-peer (P2P) or other grid computing systems where files, such as image, database, text, schematic, music, video, and other forms of electronic data may be transferred by computer systems, cell phones, laptop computers, PDA's, notebooks, internet servers, intelligent appliances etc. in business, personal or community collaboration environments. The types of algorithms might include any number of elements or combinations of elements including encoded data, hash against subsets of data, data attributes [e.g., word counts, generation dates, kwic index references, pixel values, schematic box counts, etc.] file attributes, placements of specific data or data types [e.g., longest sentence is in paragraph 3 page 12, image on page 47 is .gif, box in center of diagram 2 is a 3 inch oval], or a set of rules for organizing piecemeal subsets of data.

Figure 2:
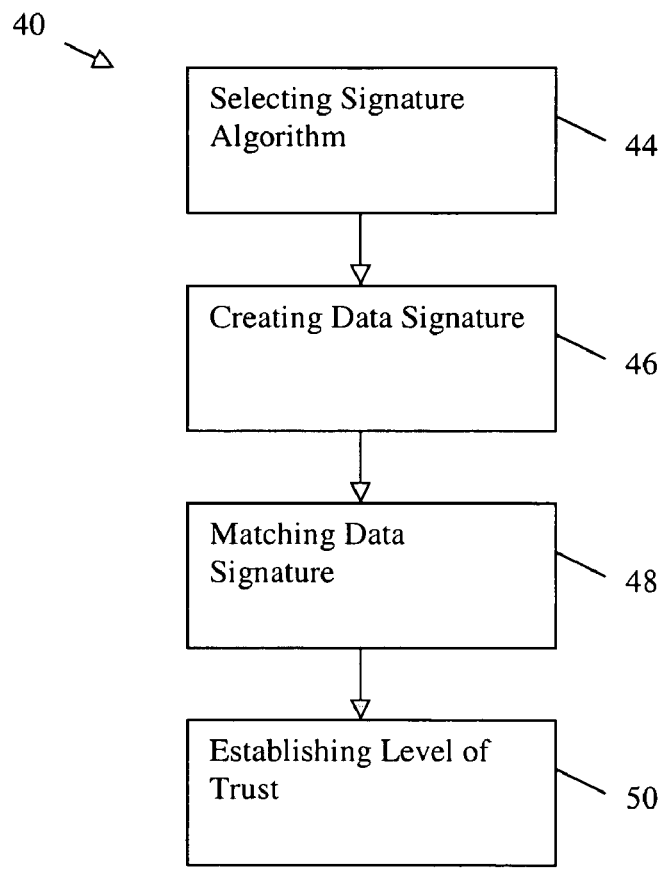
FIG. 2 illustrates a flowchart of a method for establishing trust between the entities in accordance with one aspect of the present invention.

FIG. 2 illustrates a flowchart 40 of a method for establishing trust between the entities in accordance with one aspect of the present invention. The method preferably establishes a trusting environment whereby the entities are able to interrogate the data of the other entity without providing access to their own data until after a level of trust is established with the other entity. In this manner, the present invention is able to foster the exchange of data without the entities disclosing their own data so as to prevent theft of the data from untrustworthy entities.

Block 44 relates to selecting a signature algorithm for creating an identifying characteristic for data stored on the data collections. The signature algorithm may include any number of features, such as a hash algorithm; a word placement, count, or letter discovery procedure; pixel location and value tuples; and/or a combination thereof; such as a piecemeal signature that combines multiple signature techniques. In addition, the signature algorithm may specify other features, such as a context identifier for identifying a type of data that one of the entities may desire to request from the other entity for sharing, such as a specific research topic. In this manner, the entities may execute a 'handshaking' procedure where they converse back and forth to specify the signature algorithm and the context of the sharing. Moreover, the context identifier is advantageous because it assists the entities in locating data in their data collections, as the data collections may include numerous files. Preferably, the signature technique is selected through communication between the entities such that each entity understands the signature algorithm so that it may be applied to their own data.

Block 46 relates to creating a data signature for a data array from a data element stored on one of the data collections by signing the data array according to the procedures specified in the signature algorithm. The data element is preferably selected by one of the entities if the entity desires to offer the data to another entity, requested by one of the entities sending a request to another entity for sharing, and/or selected at random, such as if the entity is searching their own data collection for data elements to receive signatures. The data element preferably corresponds with a functional group of data, such as articles, files, computation results, and the like. The data array preferably correspond with a portion of the data element but not all of the data element such that it is non-functional in so far as the other entity is unable to make use of the data array without access to the data element.

The signature provides identifying characteristics for the data array according to the instructions in the signature algorithm. As described above, the signature algorithm may comprise any number features for creating the signature. In particular, the hash creates a unique numerical identification for the data array. The word placement, count, or letter discovery signature procedures selects one or more words or letters or number of words from the data to comprise the data array. For example, the word placement signature procedure may specify selecting the first ten words in a second paragraph of an article, wherein the second paragraph is the data array and the first ten words are the data signature associated therewith. The word count signature procedure may specify counting the number words in a third paragraph of the article, wherein the third paragraph is the data array and the number of words is the data signature associated therewith. The letter discovery signature procedure may specify selecting every other letter in a first paragraph of the article, wherein the data array is the first paragraph and every other letter is the data signature associated therewith. The piecemeal signature procedure may specify hashing a second paragraph of the article and counting the number of words in a fourth a paragraph of the article, wherein the second and fourth paragraph is the data array and the combination of the hash and number of words is the data signature associated therewith. Of course, as described above, the present invention is not limited to electronic articles or research related items. Rather, the present invention contemplates sharing files in any number environments and is not intended to be limited by the foregoing description of signing articles, data may be signed in other ways to suit the data being signed.

Block 48 relates to matching the signature determined in block 46 with a corresponding signature of the first entity. Preferably, the signature from block 46 is communicated over the network from the second entity to the first entity. However, the signature may be communicated to a third entity (not shown), which is separate from the first entity, such that the third entity stores the signature for further processing, as described below. For exemplary purposes, the signature is communicated from the second entity to the first entity, however, this is not intended to limit the scope of the present invention.

Preferably, the signature algorithm includes a context identifier to assist the first entity in locating data elements relevant to the received data signature. Once a group of the first entity's data elements are located based on the context identifier, the first entity follows the procedures specified in the signature algorithm to create a data signature from data arrays of each data element in the group. Each of these signatures is analyzed to determine whether it matches the signature received from the second entity. Once a match is found, preferably, further searching for a match is complete. However, additional searching for duplicate matches is also contemplated. As described above, the third entity may be used to determine the matching signatures, such that the first entity would provide one or more signatures to the third entity whereby the third entity would then determine whether the signature(s) matches.

Preferably a correlation value or other datum is generated for each signature comparison for indicating a measure of data array commonality between the data arrays associated with the compared signature. The correlation value is advantageous for determining whether the signatures match. For example, a binary or absolute correlation may be required such that the signatures must exactly match. A percentage correlation may be required such that the signatures must match within a specified percentage of accuracy, which is advantageous to permit partially matching signature to be classified as matching signatures and thus prevent the problem of discarding matches because one or two words may be different. A correlation value is preferably generated for each signature from the first entity. However, the number of signatures taken from the first entity may be limited once a sufficient number of correlations values are determined and/or if a sufficiently high correlation value is determined for one of the data arrays, i.e., a matching signature is located.

The determination of a matching signature may include any number of other requirements, including multiple matching determinations which may be made for a single data array, such as if the signature algorithm specifies a piece-meal signature algorithm and/or to compensate for slightly differing data elements, such as by searching different portions of the data elements for a matching signature other than the portions specified in the signature algorithm. For example, the same articles or portions of articles may be found on both entities but with different formatting such that the third paragraph of one article corresponds with the fifth paragraph on the other even though the content of the articles is the same, which is a problem if the signature algorithm only specifies the third paragraph. The multiple matching determination may override the signature algorithm and continue searching other portions of the article for a matching signature, which may be desirable if the entities expect to share this data even though the formatting is different. Preferably, the signature algorithm specifies whether the multiple matching determinations may be made for each data array.

Block 50 relates to establishing a level of trust between the entities based on the correlation value for the matching or partially matching signature. The level of trust is aimed at providing each entity with an indication of data commonality for use by the entity in determining whether the other entity is legitimately interested in sharing data on a particular matter.

Preferably, the level of trust is based on multiple signatures taken from multiple data elements so that the entities may determine whether the other entity has more than one matching data element. Having multiple data elements with matching signatures is advantageous in that researchers and other filing sharing groups are more likely to trust and share data with another entity that has a commonality of data, as the commonality indicates that the other entity is unlikely to be feigning possession of data valued by the other entity.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for establishing trust between mutually mistrusting first and second entities, wherein each entity includes an electronic data collection of data and each desires to build trust with the other so that information stored on their respective data collections may be shared in a trusting environment, the method comprising:
   determining a first signature for a first data array selected from a portion of a first data element stored on the data collection of the first entity;
   determining a second signature for a second data array selected from a portion of a second data element stored on the data collection of the second entity;
   generating a signature correlation value for the first and second signatures, the signature correlation value indicating a measure of data array commonality between the first and second signatures;
   establishing a level of trust based on the signature correlation value;
   identifying respective first and second portions of the first and second electronic data collections that have not been relied upon to establish the level of trust; and
   determining which portions of the first and second portions are eligible for sharing between the entities as a function of the level of trust.

2. The method of claim 1 further comprising generating a number of signature correlation values for a number of data arrays selected from a number of data elements capable of being transferred between the first and second entities, wherein the method further comprises determining the level of trust based on the number of signature correlation values.

3. The method of claim 2 further comprising determining a high level of trust if a predefined number of signature correlations values are within a predefined correlation range, the predefined correlation range defining acceptable limits on matching the signatures.

4. The method of claim 3 further comprising selecting the predefined correlation range to correspond with absolute correlation such that the signatures exactly match.

5. The method of claim 1 further comprising selecting the data element as a functional group of data capable of being transferred between the first and second entities and the data array as a non-functional group of data within the data elements, wherein the data elements are documents.

6. The method of claim 5 further comprising the first entity searching the data collection of the first entity for the first data array in response to receiving the second signature.

7. The method of claim 1 further comprising the first entity generating the signature correlation value in response to receiving the said second signature from the second entity such that the first entity establishes the level of trust.

8. The method of claim 7 further comprising providing a context identifier with the second signature to assist the first entity in searching the data collection of the first entity.

9. The method of 1 wherein determining the signatures includes applying a hash algorithm over a segment of the data arrays.

10. The method of claim 1 wherein determining the signatures includes applying a word placement, count, or letter discovery procedure to a segment of the data arrays.

11. The method of claim 1 wherein determining the signatures includes applying a hash algorithm over a segment of the data arrays in combination with word count and letter discovery procedure.

12. The method of claim 1 wherein determining the signatures includes creating a piecemeal signature from multiple segments of the data arrays such that each signature comprises a composite correlation of the multiple segments.

13. A method for establishing trust between mutually mistrusting first and second entities, wherein each entity includes an electronic data collection of data and each desires to build trust with the other so that information stored on their respective data collections may be shared in a trusting environment, the method comprising:
   determining a first signature for a first data array selected from a portion of a first data element stored on the data collection of the first entity;
   determining a second signature for a second data array selected from a portion of a second data element stored on the data collection of the second entity;
   generating a signature correlation value for the first and second signatures, the signature correlation value indicating a measure of data array commonality between the first and second signatures;
   establishing a level of trust based on the signature correlation value;
   generating a number of signature correlation values for a number of data arrays selected from a number of data elements, wherein the method further comprises determining the level of trust based on the number of signature correlation values;
   determining a high level of trust if a predefined number of signature correlations values are within a predefined correlation range, the predefined correlation range defining acceptable limits on matching the signatures; and
   wherein the high level of trust represents that a number of data arrays of the first and second entities have closely matching signatures such that it is likely that additional data of the first and second data collections having non-matching signatures is likely to be of value to the other entity, and the method further comprises sharing at least a portion of the non-matching signature data between the entities if the high level of trust is determined.

14. The method of claim 13 wherein the entities are computers or servers in communication with each other over a network, and the method further comprises transferring the shared data over the network.

* * * * *

UNITED STATES PATENT AND TRADEMARK OFFICE
CERTIFICATE OF CORRECTION

PATENT NO.       : 7,596,700 B2               Page 1 of 1
APPLICATION NO.  : 11/022710
DATED            : September 29, 2009
INVENTOR(S)      : Milligan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twenty-eighth Day of September, 2010

David J. Kappos
*Director of the United States Patent and Trademark Office*